June 5, 1962

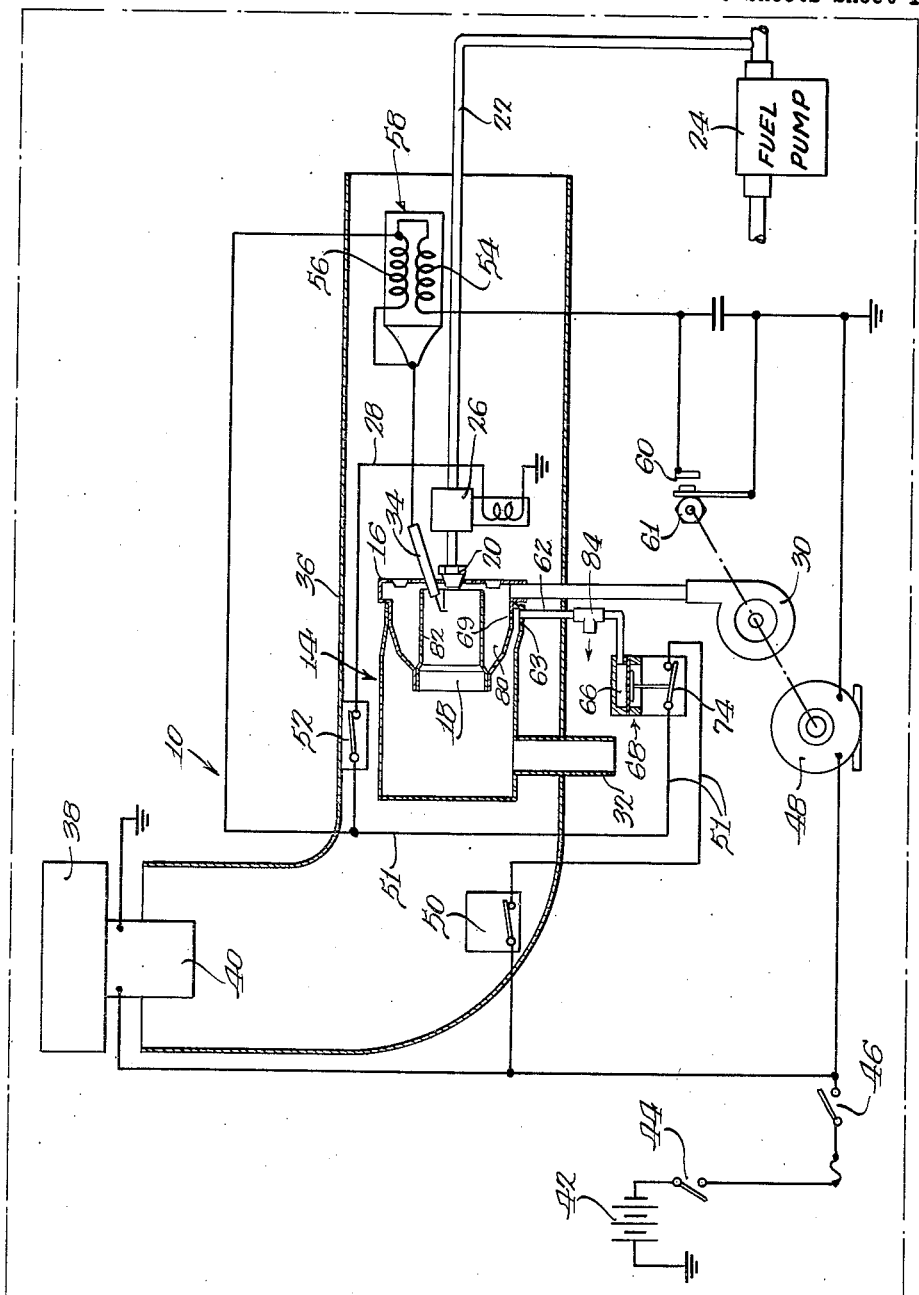

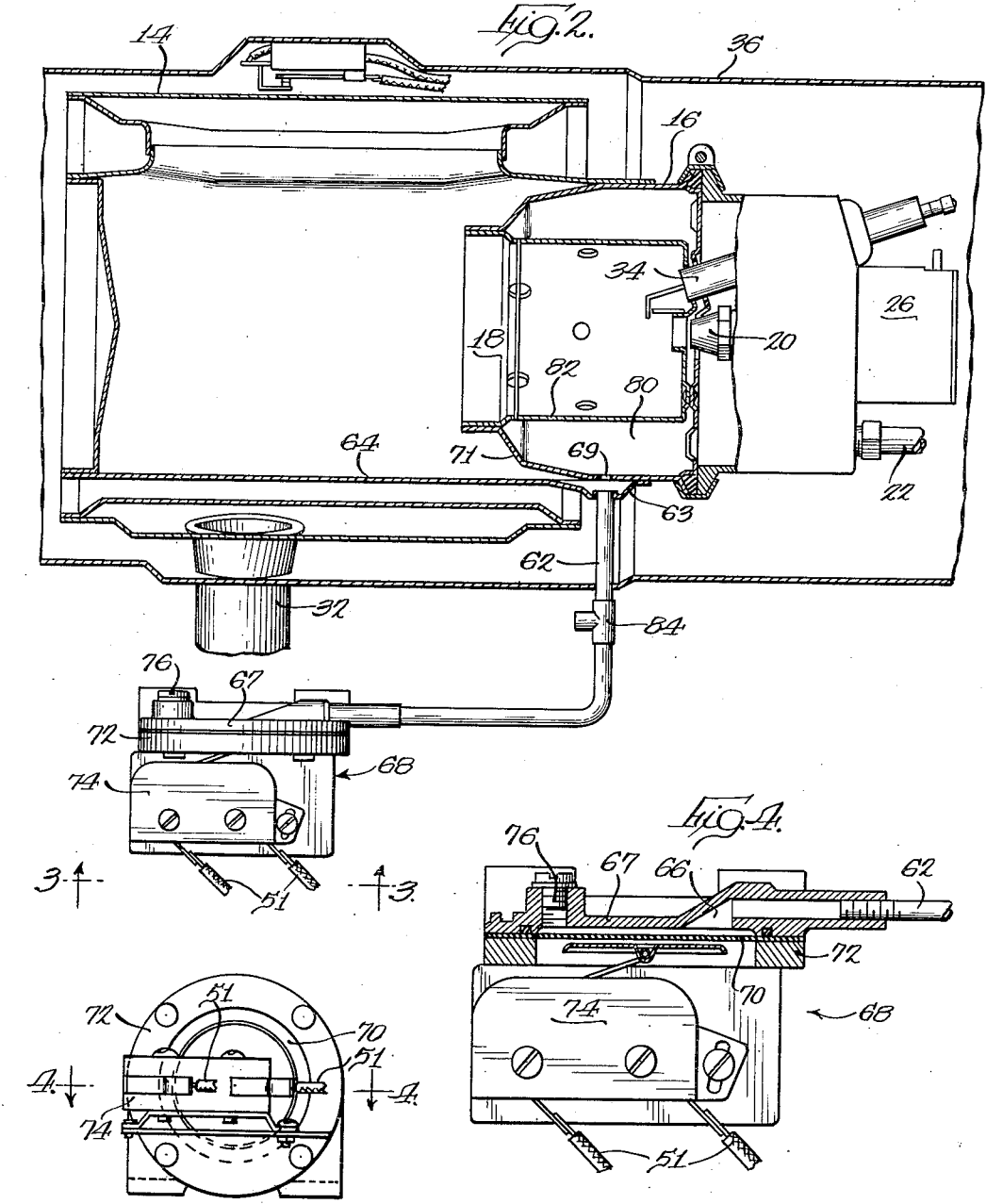

G. J. FAIRBANKS 3,037,551

FLAME FAILURE SAFEGUARD FOR COMBUSTION HEATERS

Filed July 8, 1959

INVENTOR.
Gordon J. Fairbanks
BY
Augustus S. Doivas
Atty.

United States Patent Office 3,037,551
Patented June 5, 1962

3,037,551
FLAME FAILURE SAFEGUARD FOR
COMBUSTION HEATERS
Gordon J. Fairbanks, Indianapolis, Ind., assignor to Stewart-Warner Corporation, Chicago, Ill., a corporation of Virginia
Filed July 8, 1959, Ser. No. 825,728
6 Claims. (Cl. 158—28)

The present invention relates to combustion heaters for automotive vehicles. Heaters of this character are disclosed in U.S. Patents Nos. 2,834,336; 2,844,140; and 2,844,195.

Such heaters are ordinarily designed to cycle through combustion periods, during which liquid fuel is ignited and burned in a heater at its full rated capacity, followed by dormant periods during which combustion ceases and ventilating air is heated by heat previously absorbed by the physical structure of the heater. Thus, it is necessary that the liquid fuel, usually gaseline, be ignited, not only when the heater is initially put into operation but also at the beginning of each successive combustion period.

In the event the liquid fuel supplied to the combustion space within a heater should for any reason fail to ignite, the unburned fuel released in the heater could create a hazardous condition. Moreover, the failure of the fuel to ignite could prevent operation of structure which normally closes off the supply of fuel at the end of a combustion period.

The problem of eliminating this hazard from combustion heaters designed to be manufactured on a mass production basis for use in large numbers in automotive vehicles is complicated by the paramount necessity, as a practical matter, for avoiding use of unduly expensive components in the heaters and for generally minimizing the cost of the heaters while at the same time assuring reliable and safe operation in this particular environment where there is no assurance that any recommended servicing standards will be maintained.

One object of the invention is to provide for use in an automotive vehicle, a combustion heater having a novel and improved construction which effectively prevents any hazard from arising from unburned liquid fuel released into the heater.

A further object is to provide an improved combustion heater well-adapted for economical manufacture for use in automotive vehicles and incorporating improved means which responds immediately to the release of abnormal quantities of unburned liquid fuel into the heater to prevent a hazardous condition from arising.

Another object is to provide an improved combustion heater, suited for use in automotive vehicles, that is rendered safe in the event of an ignition failure by low cost safety features incorporated into the heater in such manner that the heater responds immediately to a failure of fuel to ignite to cut off the fuel supply and disable the fuel igniting means in the heater before a hazardous condition can deveolp.

Another object is to provide for use in an automotive vehicle powered by an internal combustion engine, an improved combustion heater incorporating safety features susceptible of economical manufacture which responds immediately to the release of abnormal quantities of unburned fuel into the heater to safely dispose of the fuel before a hazardous condition arises.

A further object is to provide a combustion heater of the above character incorporating safety features as recited in the preceding objects, which are inherently reliable in the environment in which automotive vehicles are used and which do not substantially increase the overall cost of the heater.

Other objects and advantages will become apparent from the following description of the exemplary forms of the invention illustrated in the drawings, in which:

FIG. 1 is a schematic illustration of a combustion heater embodying the invention and incorporated into an automotive vehicle, indicated in phantom;

FIG. 2 is a fragmentary transverse section view of the improved heater illustrated in FIG. 1;

FIG. 3 is a view taken with reference to line 3—3 of FIG. 2 and showing safety switch means incorporated into the heater;

FIG. 4 is a partially sectioned view of the safety switch means taken with reference to line 4—4 of FIG. 3;

Figure 5:
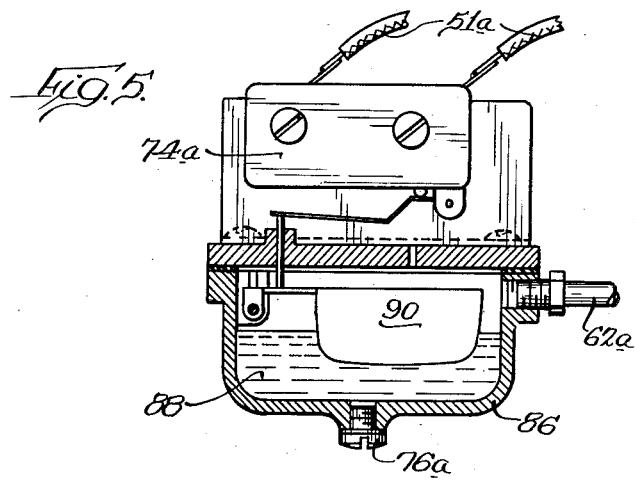
FIG. 5 is a view generally similar to FIG. 4 but showing a modified form of safety switch operating structure.

Referring to the drawings in greater detail the liquid fuel burning combustion heater 10, illustrated schematically in FIG. 1 and forming an exemplary embodiment of the invention, is adapted for use in an automotive vehicle 12, diagrammatically illustrated in phantom in this figure. A sheet metal heat exchanger 14 together with a burner 16 fitted into one end of the heat exchanger define an enclosed space or chamber 18 for the combustion of liquid fuel sprayed into the combustion space from a nozzle 20 in the burner.

The fuel, usually gasoline, is supplied to the nozzle 20 through a line 22 connected to the output side of the vehicle engine fuel pump 24 which supplies gasoline to the engine carburetor (not shown). The flow of fuel to the nozzle 20 is controlled by a normally closed solenoid valve 26, which is energized to open the valve by current supplied through an electrical lead 28. Combustion air is supplied to the burner 16 from a blower 30 and the products of combustion are discharged through an exhaust connection 32 from the heat exchanger 14. Fuel and air are ignited in the burner 16 by means of a spark plug 34.

Ventilating air for the automotive vehicle 12 is heated by heat generated by combustion in the space 18 and transmitted through the heat exchanger 14 to the ventilating air. As shown, ventilating air to be heated is directed past the heat exchanger 14 by a duct 36 which encases and extends beyond the heat exchanger and burner. Air is drawn through the duct 36 and discharged to the vehicle 12 by a blower 38 driven by an electric motor 40.

The construction of the heat exchanger 14, burner 16, and adjacent major components of the basic structure of the heater are illustrated in somewhat greater detail in FIG. 2. For a more specific disclosure of heater components not illustrated in detail here, reference may be made to the previously mentioned Patents Nos. 2,834,336; 2,844,140; and 2,844,195.

The heater 10 is controlled to operate cyclically through combustion periods during which fuel is ignited and burned in the space 18, followed by dormant periods in which the ventilating air moving past the heat exchanger 14 is heated by heat previously absorbed by the heat exchanger structure.

As shown, the heater 10 is controlled by electric power supplied from the vehicle battery 42 through the ignition switch 44 to a heater switch 46. Closure of the switch 46 energizes the ventilating blower motor 40 and a motor 48 which drives the combustion air blower 30. The switch 46 also supplies power to a control thermostat 50 mounted in the duct 36 downstream from the heat exchanger 14. The thermostatic switch 50 is of a conventional construction and closes when the ambient air temperature drops below a predetermined value to initiate a combustion cycle of the heater and opens when the ambient air temperature reaches a higher predetermined value to terminate combustion.

Closure of the thermostatic switch 50 energizes the solenoid valve 26 to supply fuel to the burner 18 and energizes the ignition means including the spark plug 36 to ignite the fuel in the burner.

For this purpose, a conductor 51 from the output terminal of the switch 50 is connected through a normally closed overheat safety switch 52, which opens only when the temperature of the heat exchanger 14 rises above a predetermined temperature limit, to the solenoid valve lead 28. The conductor 51 also connects to a tap between the primary and secondary coils 54, 56 of a conventional spark transformer or coil 58. The primary coil 54 is intermittently grounded through breaker points 60 which are operated by a cam 61 driven by the blower motor 48. High voltages generated in the secondary coil 56 are transmitted to the spark plug 34 to effect ignition of the fuel.

Even though gasoline burning heaters of this character have reached a high state of development and are very reliable in operation, it is nevertheless necessary to take into account the possibility, however remote, of gasoline being supplied into the combustion space 18 without igniting. The continued presence of raw unburned gasoline in the combustion space could create a hazardous condition. Moreover, in the event of an ignition failure, the thermostat 50 is not operated to de-energize the fuel valve 26.

Some expedients previously devised for preventing hazardous conditions developing from the release of fuel into the combustion space without ignition taking place are for one reason or another unsuitable for use in a combustion heater designed to be manufactured on a mass production basis for widespread use in automotive vehicles. To be acceptable, as a practical matter, for use in this service, a combustion heater must be susceptible of economical manufacture and completely dependable in operation. Some expedients of rendering such heater safe may not be acceptable in the automobile industry because of the manufacturing costs involved.

The heater 10 embodying the present invention is fully protected against hazards, arising from the abnormal release of unburned gasoline into the combustion space 10, in an improved manner which does not materially increase the overall cost of the heater.

In the event fuel released into the combustion space 18 fails to ignite, the fuel drains to the bottom of the combustion space where it is collected by drainage means 63 and discharged into a conduit 62. Preferably, the drainage means 63 is formed by a portion of the inner casing 64 of the heat exchanger 14, FIG. 2, which underlies an inwardly projecting portion of the burner 16 and bounds the lower extremity of the combustion space 18. This portion 63 of the inner casing is depressed somewhat to form a shallow blister into which unburned fuel will drain. Any unburned fuel draining to the bottom of the burner 16 gravitates to a drain opening 69 formed in the bottom of the burner shell 71 in overlying relation to the collecting blister 63. The inlet end of the conduit 62 is connected to the bottom of the blister or drainage means 63 as shown.

Fuel entering the conduit 62 flows to means interconnected with the conduit, which effectively precludes a hazardous condition from developing from the presence of unburned fuel in the heater. As shown in FIGS. 1 to 4, the conduit 62 connects to a liquid pressure chamber 66 in a pressure operated switch assembly 68 located a substantial distance below the level of the inlet of the conduit 62.

As shown, the pressure chamber 66 is formed by a cover plate 67 overlying a flexible and somewhat baggy diaphragm 70 supported at its marginal edge by a base 72. The chamber 66 thus formed is circular and has a large diameter exposing a rather large area of the diaphragm to the pressure of fluid in the chamber 66. Yet the thickness of the chamber 66 is quite thin, minimizing the volume of fluid required to fill the chamber.

The diaphragm 70 is connected, as shown in FIG. 4, to open a normally closed precision switch 74 when the fluid pressure within the chamber 66 exceeds a predetermined value. As shown, in FIG. 1, the normally closed switch 74 is connected in series with the thermostatic switch 50 so that opening of the switch 74 de-energizes both the ignition circuit and the fuel valve solenoid 26.

The location of the pressure chamber 66 a substantial distance below the drainage means 63 provides for development of a substantial pressure head of liquid fuel on the rather large area of the diaphragm 70 to create more than sufficient operating force to assure opening of the switch 74 in the event of an ignition failure.

Opening of the switch 74 by an incipient collection of fuel in the chamber 66 and in the conduit 62 leading to the chamber precludes operation of either the fuel igniting means or the fuel supply means until the unburned fuel has been removed from the chamber 66. This is done by removing a drain plug 76 from the cover plate 68, FIG. 4, at the time the heater is serviced and checked to determine and remove the cause of the ignition failure.

The burning of fuel in the heater produces combustion gases heavily laden with moisture in the space 18 communicating with the conduit 62. Cooling of such moisture laden gases in the conduit 62 could produce a water condensate in the conduit which would drain into the pressure chamber 66 to produce an unnecessary opening of the switch 74. Moreover, freezing of water in the chamber 66 could render the switch 74 inoperative for its intended purpose.

Any possibility of this occurring is precluded by continuously scavenging the conduit 62 leading to the chamber 66 with fresh air uncontaminated by products of combustion.

For this purpose, the previously mentioned opening or aperture 69 in the bottom of the burner shell 71 is located in relation to the intake end of the conduit 62 to blow a continuous stream of fresh air into the conduit. The aperture 69 communicates with a supply of fresh air under somewhat elevated pressure in a plenum chamber 80 between a burner shell 71 and an inner cup 82 of the burner. The plenum chamber 80 communicates with the outlet of combustion air supply blower 30.

Fresh air directed into the conduit 62 from an aperture 69 is released through a simple gas and liquid separating device 84 mounted in the conduit 62 somewhat above the level of the chamber 66. This air and liquid separating device can be formed, as shown, by a simple T fitting (also denoted by the numeral 84) which allows the air circulated through the conduit to escape while any liquid fuel draining down through the conduit flows on past the T into the chamber 66 to cut off the ignition and fuel supply as described.

The fuel draining down through the tube 62 can actuate the pressure operated switch 74 as described or it can actuate a float operated switch 74a (FIG. 5) used for the same purpose. In FIG. 5, which illustrates a modified form of switch operator, components corresponding to those previously described are designated by the same reference numerals with the addition of the suffix "a." As shown here, the conduit 62a is connected with a covered float bowl 86 defining a float chamber 88 in which a pivotally mounted float 90 is connected to operate a precision switch 74a connected in series with the conductor 51a through which both the fuel supply solenoid and the heater igniter are energized. This normally closed switch 74a is opened by the float 90 when liquid fuel accumulates in the chamber 88, which is of relatively small size. The conduit 62a is connected to the heater in the same manner as the previously described conduit 62.

Figure 6:
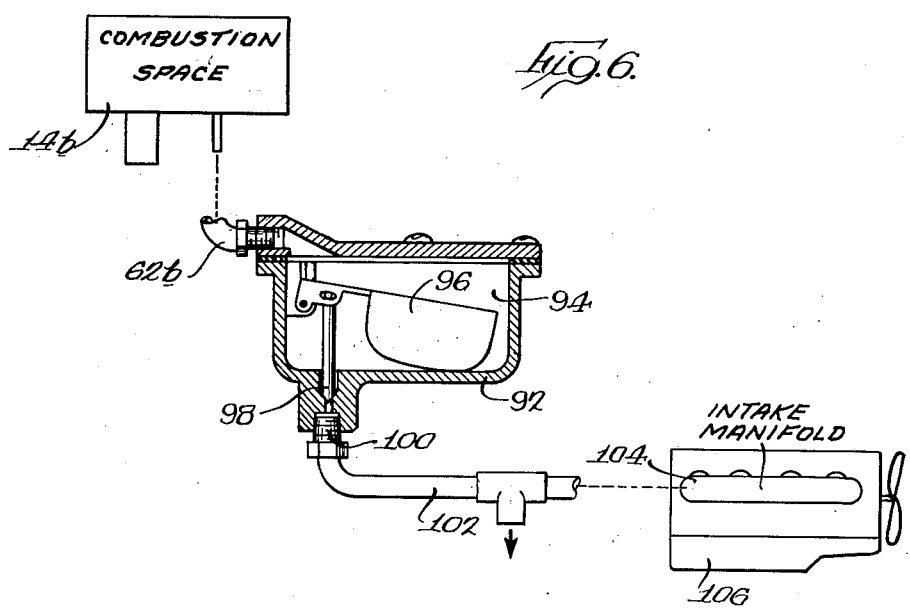
FIG. 6 illustrates a further modified form of the invention and shows a sectional view of safety structure together with an illustration of its relationship to the heater and the vehicle engine.

A modified form of the invention is illustrated in FIG. 6 in which components similar to those previously described are designated by the same reference numbers with the addition of the suffix "b." Here the conduit 62b from the heater exchanger 14b is connected to a float bowl 92 defining a float chamber 94 in which a float 96 is connected to open a valve 98 at the bottom of the chamber 94 as an incident to the accumulation of a small quantity of fuel in the chamber 94. The valve 98, which is normally closed, connects the bottom of the chamber 94 to a suction connection 100, which is connected through a tube 102 with the intake manifold 104 of the combustion engine 106 which powers the vehicle 12.

Opening the valve 98 allows the reduced pressure or vacuum of the intake manifold 104 to quickly aspirate the liquid from the chamber 94. This removal of the fuel from the chamber 94 and hence from the combustion space 18 in the heater automatically as an incident to the accumulation of an incipient collection of fuel in the chamber 94 prevents any accumulation of fuel in the heater which could give rise to a hazardous condition. Fuel aspirated from the chamber 94 into the manifold 104 is safely burned in the engine 106.

The normally closed condition of the valve 98 eliminates any disturbance in the normal operation of either the engine 106 or the heater due to the flow of air from the heater into the intake manifold 104.

It will be appreciated that the invention is not necessarily limited to the particular construction of the embodiments illustrated but includes variants and equivalents within the spirit and scope of the invention as defined by the appended claims.

The invention is claimed as follows:

1. For use in an automotive vehicle, a combustion heater comprising, in combination, heat generating means defining combustion space therein, means for supplying liquid fuel to said combustion space and including a fuel supply control circuit, means for supplying combustion air to said combustion space and including means defining a plenum chamber for combustion air, drainage means for collecting unburned fuel from the lower side of said combustion space, a downwardly extending conduit having an intake end connected to said drainage means, means for directing a stream of fresh air from said plenum chamber into said intake end of said conduit, means defining a fuel receiver connected to said conduit at a level substantially lower than said intake end thereof, a gas and liquid separating device connected into said conduit above said receiver to provide for the escape of air directed into the conduit while allowing liquid fuel in the conduit to drain into receiver, pressure responsive switch means associated with said receiver for operation by the pressure of fuel therein, and said switch means being connected into said control circuit to stop the supply of fuel to said combustion space in response to the pressure of fuel in said receiver.

2. For use in an automotive vehicle, a combustion heater comprising, in combination, heat exchanger means including means defining combustion space therein, means for supplying liquid fuel to said combustion space and including a fuel supply control circuit, means for supplying fresh air to said space for combustion, fuel drainage means located at the lower side of combustion space to collect unburned fuel supplied to said space, a conduit having an inlet end connected to receive fuel from said drainage means, means for directing fresh air into said conduit inlet end from said air supplying means, means defining a chamber connected to said conduit and located at a level substantially below said drainage means, a gas and liquid separating device connected into said conduit a substantial distance above said chamber to discharge air from the conduit while allowing liquid fuel to drain therethrough into the chamber, a control switch connected into said fuel supply control circuit, and means for operating said switch to terminate the supply of fuel to said combustion space through said fuel supply means as an incident to the drainage of fuel to said chamber.

3. For use in an automotive vehicle, a combustion heater comprising, in combination, heat generating means defining combustion space therein, means for supplying liquid fuel to said combustion space and including a fuel supply control circuit, means for supplying combustion air to said combustion space and including means defining a plenum chamber for combustion air, drainage means for collecting unburned fuel from the lower side of said combustion space, a downwardly extending conduit connected to said drainage means, means for directing a stream of air from said plenum chamber into said conduit, means including a flexible diaphragm defining a fluid pressure chamber which is relatively thin in relation to the chamber defining area of the diaphragm, means connecting said chamber to said conduit at a level substantially below said drainage means, a gas and liquid separating device connected into said conduit above said chamber to provide for the escape of air directed into the conduit while allowing fuel to drain through the conduit into said chamber, switch means connected into said fuel control circuit, and means connecting said diaphragm to said switch means to operate the latter to stop the supply of fuel to said combustion space in response to pressure of fuel on the diaphragm.

4. For use in an automotive vehicle, a combustion heater, comprising, in combination, heat exchanger means including an inner casing defining combustion space, a burner fitted into said heat exchanger and including means defining a plenum chamber for combustion air disposed in overlying relation to a lower portion of said inner casing, means for supplying liquid fuel to said burner and including a fuel supply control circuit, a portion of said inner casing underlying said burner being deformed to define drainage means for collecting unburned fuel supplied through said burner to said combustion space, a conduit having an intake connected to said drainage means, said burner defining a fuel draining opening in the lower side thereof communicating with said plenum chamber and aligned with said conduit intake to direct air from said plenum chamber into said conduit, means defining a chamber for fuel connected to said conduit a substantial distance below said drainage means, an air and liquid separating device connected into said said conduit between said intake thereof and said fuel chamber to release air directed into said conduit from said plenum chamber while allowing drainage of fuel through the conduit into said fuel chamber, and means responsive to an incipient collection of fuel beyond a predetermined depth in said fuel chamber for preventing further accumulation of fuel in said fuel chamber.

5. For use in an automotive vehicle, a combustion heater comprising, in combination, heat exchanger means including an inner casing defining combustion space, a burner fitted into said heat exchanger means and including means defining a plenum chamber for combustion of air disposed in overlying relation to a lower portion of said inner casing, means for supplying liquid fuel to said combustion space and including a fuel supply control circuit, a portion of said inner casing underlying said plenum chamber being deformed to define drainage means for unburned fuel supplied to said combustion space, a conduit having an intake connected to receive fuel from said drainage means, means defining an opening from said plenum chamber positioned to direct scavenging air from said plenum chamber into said conduit intake, means defining a fuel receiving chamber connected to said conduit a substantial distance below said drainage means, and air and liquid separating device connected into said conduit between said intake and said fuel receiving chamber to release scavenging air directed into said conduit while allowing liquid fuel to drain through the conduit into said fuel receiving chamber, a control switch connected into said circuit, and operating means for said switch associated with said fuel receiving chamber for operating the switch to shut off the fuel supply to said combustion space as an incident to the accumulation of fuel in said last mentioned chamber.

6. For use in an automotive vehicle, a combustion heater comprising, in combination, heat exchange means including an inner casing defining combustion space, a burner fitted into said heat exchanger means and including means defining a plenum chamber for combustion of air disposed in adjacent relation to a lower portion of said inner casing, means for supplying liquid fuel to said combustion space and including fuel supply control means including an electrical control circuit therefor, fuel igniting means including an electrical control circuit therefor, a lower portion of said inner casing being deformed to define drainage means for unburned fuel supplied to said combustion space, a conduit having an intake connected to receive fuel from said drainage means, means defining an opening from said plenum chamber positioned to direct scavenging air from said plenum chamber into said conduit intake, means defining a fuel receiving chamber connected to said conduit a substantial distance below said drainage means, an air and liquid separating device connected into said conduit between said intake and said fuel receiving chamber to release scavenging air directed into said conduit while allowing liquid fuel to drain through the conduit into said fuel receiving chamber, control switch means connected into both of said circuits, and pressure responsive operating means associated with said fuel receiving chamber and connected to said switch means to stop the supply of fuel to said combustion space and render said igniting means inoperative in response to the pressure of fuel in said fuel receiving chamber.

References Cited in the file of this patent

UNITED STATES PATENTS

| | | |
|---|---|---|
| 1,670,274 | Ogilvy | May 15, 1928 |
| 1,688,163 | Tapp et al. | Oct. 16, 1928 |
| 1,723,031 | Good | Aug. 6, 1929 |
| 2,757,662 | Baier et al. | Aug. 7, 1956 |